(12) United States Patent
Ukigaya

(10) Patent No.: US 6,940,634 B2
(45) Date of Patent: Sep. 6, 2005

(54) ELECTROPHORETIC DISPLAY DEVICE

(75) Inventor: Nobutaka Ukigaya, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/808,988

(22) Filed: Mar. 24, 2004

(65) Prior Publication Data
US 2004/0246560 A1 Dec. 9, 2004

(30) Foreign Application Priority Data
Mar. 27, 2003 (JP) ......................................... 2003-088070

(51) Int. Cl.$^7$ .......................... G02B 26/00; G09G 3/38; G03G 17/04
(52) U.S. Cl. ...................... 359/296; 359/290; 345/105; 430/32
(58) Field of Search .............................. 359/296, 290, 359/238, 295; 345/105, 107; 430/32, 34

(56) References Cited

U.S. PATENT DOCUMENTS 4,604,583 A * 8/1986 Aoyagi et al. .............. 329/308
6,828,955 B2 * 12/2004 Yamamoto et al. ......... 345/107
2004/0219306 A1 * 11/2004 Wang et al. ................. 428/1.5

FOREIGN PATENT DOCUMENTS

| JP | 59-034518 | 8/1984 |
| JP | 2002-023202 | 1/2002 |

* cited by examiner

Primary Examiner—Timothy Thompson
(74) Attorney, Agent, or Firm—Morgan & Finnegan, LLP

(57) ABSTRACT

An electrophoretic display device includes a first substrate and a second substrate disposed opposite to each other with a spacing, a partition wall for dividing the spacing into a plurality of sections, a plurality of electrophoretic particles and an insulating liquid which are disposed in the sections, a first electrode disposed at least between said partition wall and said first substrate, and a second electrode disposed on said second substrate. The electrophoretic display device is characterized in that the first electrode has an adhesive property, thus eliminating the need for a step of applying an adhesive resin for adhering the partition wall and the substrate to simplify production steps.

7 Claims, 2 Drawing Sheets

ELECTROPHORETIC DISPLAY DEVICE

FIELD OF THE INVENTION AND RELATED ART

The present invention generally relates to an electrophoretic display device for effecting display based on movement of charged particles (electro-phoretic particles).

In recent years, an electrophoretic display device which effects display by applying a voltage so as to move electrophoretic particles has received attention.

This type of electrophoretic display device has been constituted by a pair of substrates disposed with a predetermined spacing, electrophoretic particles and an insulating liquid disposed in the spacing, and a pair of electrodes to which a voltage is applied, as described in, e.g., Japanese Laid-Open Patent Application (JP-A) Sho 59-34518.

In such an electrophoretic display device, pixels are partitioned by disposing a partition wall or microcapsules so as not to move the electrophoretic particles to other pixels. For this reason, the electrophoretic display device as described in JP-A Sho 59-34518 has been produced through operations of forming an electrode on each of a pair of substrates, forming a partition wall on one of the substrates, filling an insulating liquid and electrophoretic particles in a recess (corresponding to each pixel) formed by the partition wall, providing an adhesive layer on an upper surface of the partition wall, and applying the other substrate (provided with only the electrode) onto the partition wall.

In an electrophoretic display device including microcapsules as described in JP-A 2002-023202, a sheet comprising microcapsules each containing electrophoretic particles and an insulating liquid is formed, a substrate provided with an electrode is formed, and the sheet and the substrate are adhered to each other through an adhesive layer.

In the above-described electrophoretic display devices, however, an adhesive layer for adhering a member for partitioning pixels and a substrate for supporting the member to each other has to be formed. Accordingly, production steps becomes complicate by that much, i.e., a production apparatus or step for forming the adhesive layer is required, so that the complicated production steps can cause a reduction in yield or an increase in production costs.

SUMMARY OF THE INVENTION

An object of the present invention is t provide an electrophoretic display device for accomplishing a simplification of production steps and an improvement in yield.

According to the present invention, there is provided an electrophoretic display device, comprising:

a first substrate and a second substrate disposed opposite to each other with a spacing, a partition wall for dividing the spacing into a plurality of sections, a plurality of electrophoretic particles and an insulating liquid which are disposed in the sections, a first electrode disposed at least between said partition wall and said first substrate, and a second electrode disposed on said second substrate, wherein said first electrode has an adhesive property.

According to the electrophoretic display device of the present invention, by using the electrode having an adhesive property, it is possible to eliminate the need for a conventional step of applying an adhesive layer or an application apparatus for the adhesive layer, so that the production steps can be simplified. Accordingly, it becomes possible to improve a production yield and reduce production costs.

This and other objects, features and advantages of the present invention will become more apparent upon a consideration of the following description of the preferred embodiments of the present invention taken in conjunction with the accompanying drawings.

DETAILED DESCRIPTION OF THE PREFERRED EMBODIMENTS

Hereinbelow, the present invention will be described more specifically with reference to FIGS. 1 to 4.

Figure 1:
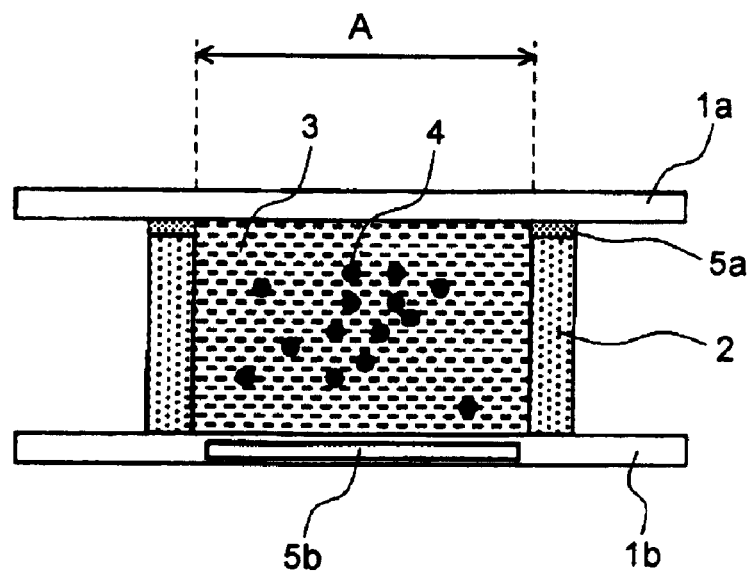
FIGS. 1 to 4 are respectively a schematic sectional view showing an embodiment of a structure of the electrophoretic display device according to the present invention.

FIG. 1 shows a sectional structure of the electrophoretic display device of the present invention. Referring to FIG. 1, an electrophoretic display device D1 includes: a first substrate 1a and a second substrate 1b disposed opposite to each other with a spacing, a plurality of electrophoretic particles 4 and an insulating liquid 3 which are disposed in the spacing, and a first electrode 5a and a second electrode 5b. The electrophoretic display device is characterized in that the first electrode has an adhesive property.

In the spacing, a partition wall 2 is disposed so as to partition a pixel A at which the insulating liquid 3, the electrophoretic particles 4, the first electrode 5a and the second electrode 4b are also disposed. In the electrophoretic display device of this type, a voltage is applied between these first and second electrodes 5a and 5b to move the electrophoretic particles 4, thus effecting display. Incidentally, for convenience of explanation, only one pixel is shown in FIG. 1.

The first electrode 5a used in the present invention is disposed between the partition wall 2 and the first substrate 1a so as to adhere these members to each other. In FIG. 1, the first electrode 5a is disposed only at a boundary portion of the pixel A and is not disposed within the pixel A. However, the first electrode 5a may be disposed at the boundary portion and within the pixel A.

Figure 3:
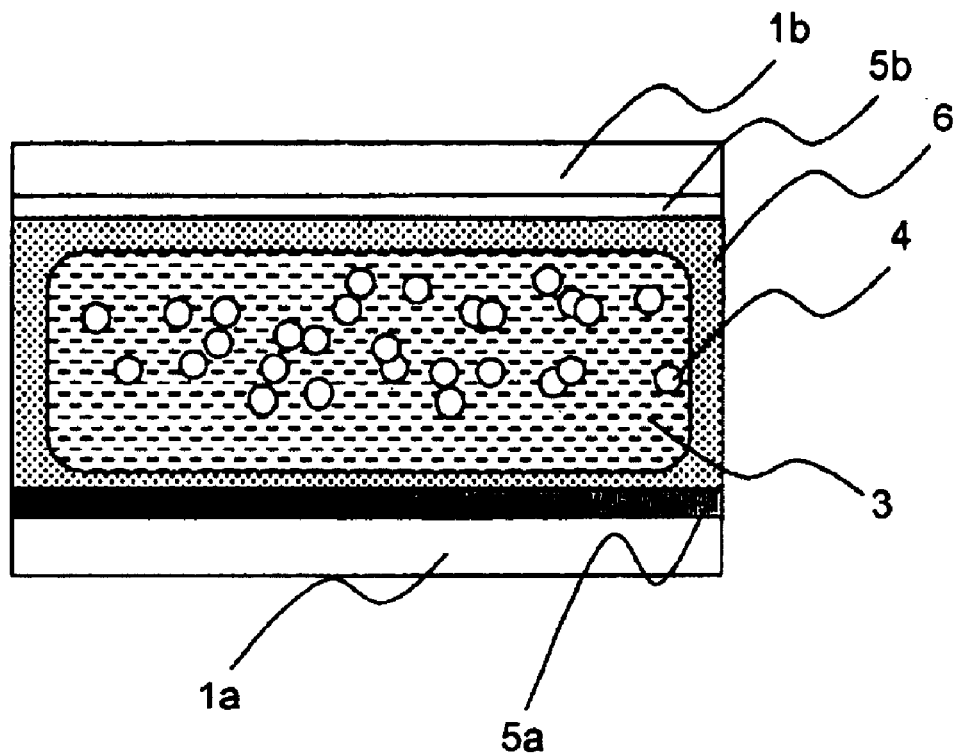

In the case of an electrophoretic display device using microcapsules as a structure for partitioning pixels a shown in FIG. 3, a first electrode 5a is formed in a sheet along a multiplicity of microcapsules 6 so as to adhere a first substrate 1a to the microcapsules 6.

Incidentally, in the case where the first electrode 5a is disposed only at the boundary of the pixel A as shown in FIG. 1 or disposed along a substantially entire surface of the first substrate 1a, it is preferable that each of the first electrodes 5a at each pixel A is brought into electric conduction so as to retain the same electric potential.

In the present invention, as the first electrode 5a, it is possible to use an adhesive electroconductive resin which comprises at least one species of a material selected from the group consisting of an electroconductive polymer, metal powder, metal fiber, electroconductive oxide powder, electroconductive oxide fiber, carbon powder, carbon fiber, graphite, graphite fiber, and electroconductive fiber. Of these materials, the adhesive resin containing carbon powder or carbon fiber has a non-light transmissive property (light absorption property), and the adhesive resin containing the electroconductive polymer or the electroconductive oxide powder has a light transmissive property. These materials can be properly used, as desired. Examples of the material for the first electrode 5a may include an electroconductive adhesive liquid silicone rubber.

Incidentally, the surface of the first substrate 1a to be adhered to the first electrode 5a can be improved in adhesive property by subjecting it to primer treatment. Further, as the first electrode 5a, it is also possible to use a light scattering material or a light reflecting material. The color of the first electrode 5a can be appropriately changed depending on its arrangement (position), shape, dimension, etc.

The first electrode 5a is disposed only at the boundary portion of the pixel A in FIG. 1 but is disposed on a substantially entire surface of the first substrate 1a so as to move the electrophoretic particles 4 in a vertical direction in the case of the electrophoretic display device, shown in FIG. 3, of a vertical movement type wherein a migration dispersion liquid (insulating liquid) 3 and electrophoretic particles 4 are encapsulated and sealed in each microcapsule 6, disposed on one of the pair of substrates 1a and 1b, sandwiched between the substrates 1a and 1b, and deformed from a spherical shape to a partially flattened shape. A part, of a outer wall portion of the microcapsule 6, which does not contact the pair of substrates 1a and 1b, constitutes the partition wall. In this embodiment, when the first substrate 1a is used as a rear (bottom) substrate and the first electrode 5a is colored black, a resultant contrast is improved.

Figure 4:
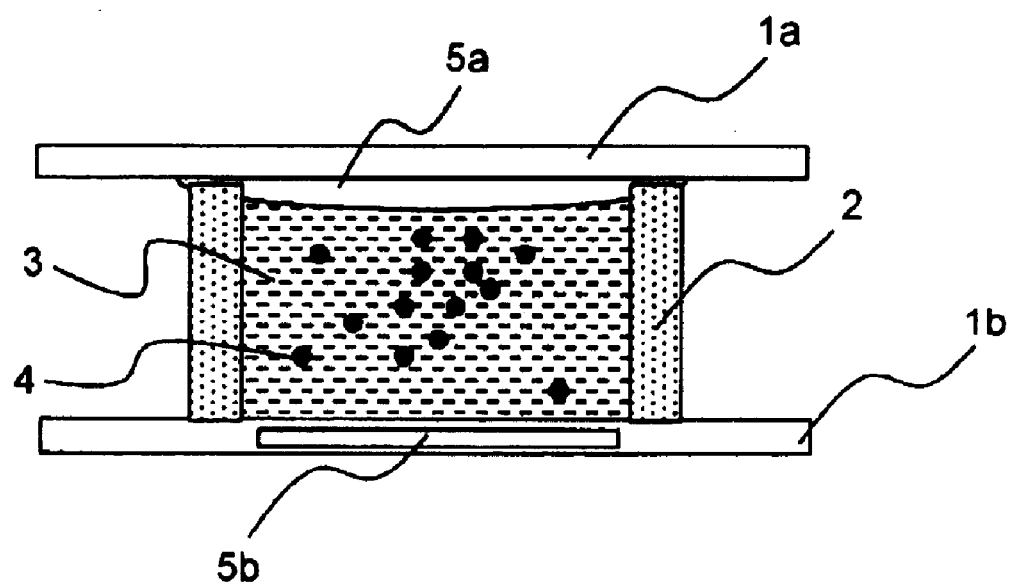

FIG. 4 shows an electrophoretic display device using a first electrode 5a, in a sheet form, which is separately prepared a first substrate 1a. In this embodiment, a partition wall 2 is formed on a second substrate 1b including a second electrode 5b, and is covered with the first electrode 5a sheet after a migration dispersion liquid (insulating liquid) 3 and electrophoretic particles 4 are filled in a spacing defined by the partition wall 2. In the case of using the surface of the first substrate 1a as a display surface, the first electrode 5a sheet is formed of a light transmissive material.

In the present invention, it is necessary for the above-described first electrode 5a not to be solved in the insulating liquid 3.

For this purpose, the following methods (1) to (3) can be used.

Figure 2:
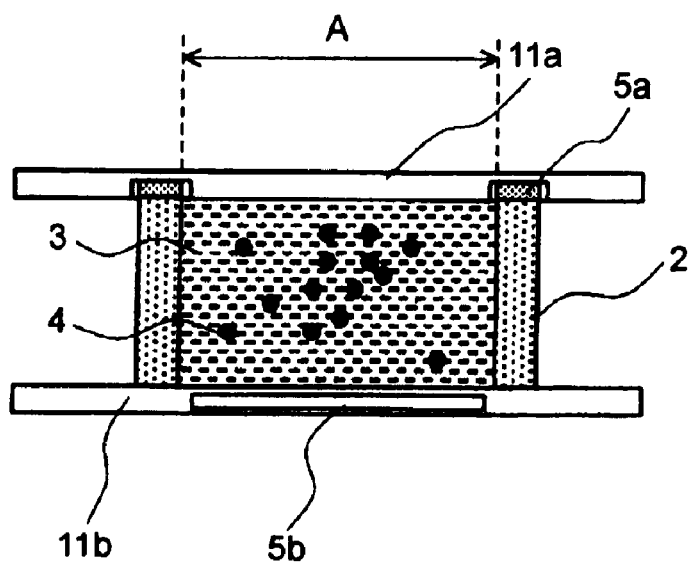

(1) A method wherein the first electrode 5a is embedded into the first substrate 1a as shown in FIG. 2 so as not to contact the insulating liquid 3.
(2) A method wherein the first electrode 5a is formed of a material which is not readily dissolved in the insulating liquid 3 (i.e., a material having a high insolubility).
(3) A method wherein a film is formed on the surface of the first electrode 5a.

Further, it is necessary to prevent injection of electric charges from the first electrode 5a into the electrophoretic particles 4.

For this purpose, the following methods (4) to (6) can be used.

(4) The same method as the method (1) described above.
(5) A method wherein an insulating film is formed on the surface of the first electrode 5a.
(6) A method wherein the first electrode surface per se is improved in insulating properties without using the insulating film.

Incidentally, arrangements and shapes of the first electrode 5a and the second electrode 5b used in the electrophoretic display device according to the present invention are not restricted by those described above with reference to FIGS. 1 to 4.

The electrophoretic display device of the present invention, e.g., as shown in FIG. 1 may be produced by such a process wherein a second electrode 5b, an insulating layer and a partition wall 2 are formed within or on a second substrate 1b; a first electrode 5a is formed on the partition wall 2 to define a recess; an insulating liquid 3 and electrophoretic particles 4 are filled in the recess; a first substrate 1a is applied to the first electrode 5a and the insulating liquid 3; and the first electrode 5a is cured or hardened.

As described above, according to the present invention, the first electrode 5a has an adhesive property, so that it is possible to eliminate the need for a step or an apparatus for applying an adhesive layer required in the conventional electrophoretic display device. As a result, the production process of electrophoretic display device can be simplified, thus realizing an improved production yield and reduction in production costs.

While the invention has been described with reference to the structures disclosed herein, it is not confined to the details set forth and this application is intended to cover such modifications or changes as may come within the purposes of the improvements or the scope of the following claims.

What is claimed is:

1. An electrophoretic display device, comprising:
a first substrate and a second substrate disposed opposite to each other with a spacing,
a partition wall for dividing the spacing into a plurality of sections, a plurality of electrophoretic particles and an insulating liquid which are disposed in the sections,
a first electrode disposed at least between said partition wall and said first substrate, and
a second electrode disposed on said second substrate,
wherein said first electrode is made of an adhesive resin.

2. A device according to claim 1, wherein said adhesive resin comprises at least one material selected from the group consisting of an electroconductive polymer, metal powder, metal fiber, electroconductive oxide powder, electroconductive oxide fiber, carbon powder, carbon fiber, graphite, graphite fiber, and electroconductive fiber.

3. A device according to claim 1, wherein the first substrate has a surface opposite to the first substrate and surface has been subjected to primer treatment.

4. A device according to claim 1, wherein the first substrate is provided with a recess in a position contacting partition wall and the first electrode is disposed in the recess.

5. An electrophoretic display device, comprising:
a first substrate and a second substrate disposed opposite to each other with a spacing,
a partition wall for dividing the spacing into a plurality of sections,
a plurality of electrophoretic particles and an insulating liquid which are disposed in the sections.
a first electrode disposed on a surface of the first substrate other than the position between the partition wall and the first substrate, and
a second electrode disposed on said second substrate,
wherein said first electrode is made of an adhesive resin.

6. A device according to claim 1, wherein the first electrode is an adhesive sheet disposed to cover the partition wall and the insulating liquid.

7. A device according to claim 1, wherein the insulating liquid and the plurality of electrophoretic particles are encapsulated in a capsule and disposed in the spacing so that an outer wall of the capsule constitutes the partition wall.

* * * * *